Figure 1:
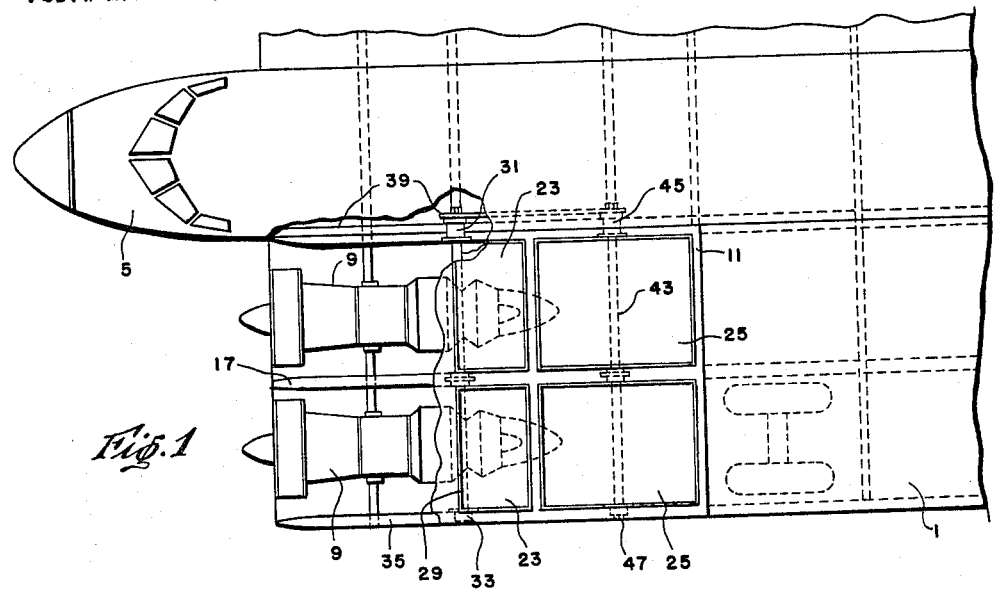

Nov. 15, 1966  V. J. BURNELLI  3,285,538

ADVANCED JET ENGINE INSTALLATION

Filed March 23, 1964  2 Sheets-Sheet 1

INVENTOR.
Vincent J. Burnelli
BY
Peck & Peck
ATTORNEYS

Nov. 15, 1966  V. J. BURNELLI  3,285,538
ADVANCED JET ENGINE INSTALLATION
Filed March 23, 1964  2 Sheets-Sheet 2
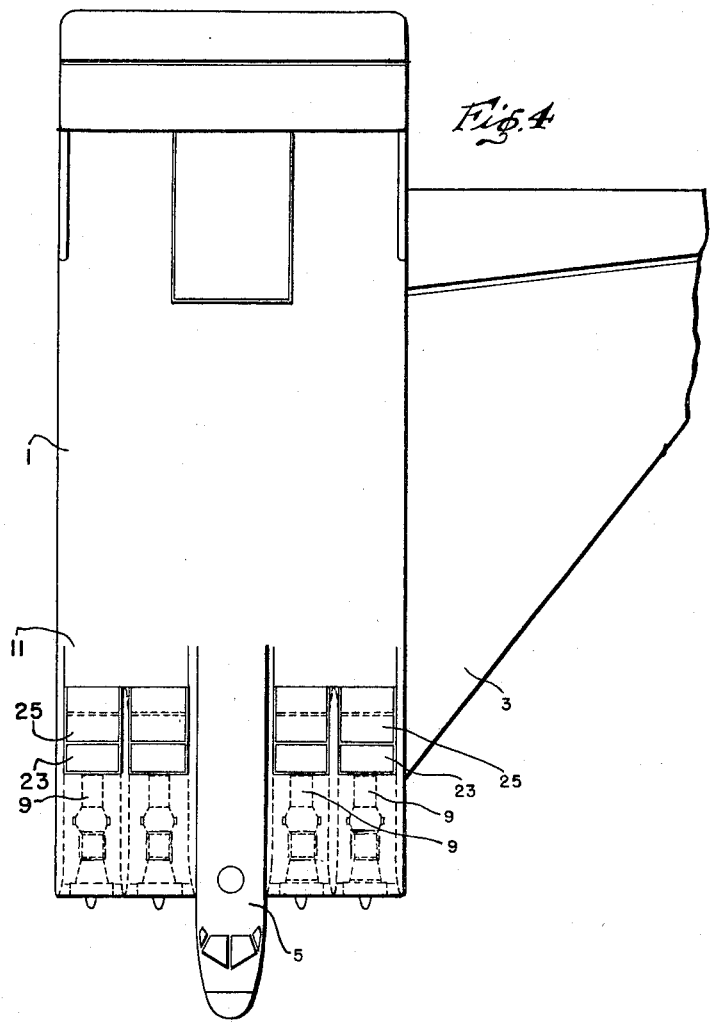
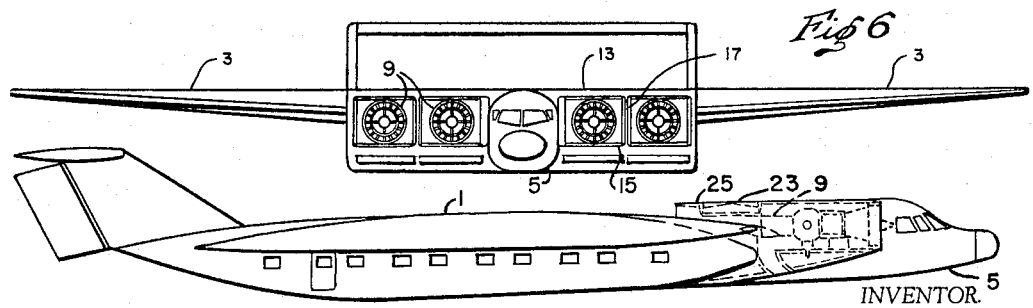
INVENTOR.
Vincent J. Burnelli
BY
Peck & Peck
ATTORNEYS

United States Patent Office 3,285,538
Patented Nov. 15, 1966

3,285,538
ADVANCED JET ENGINE INSTALLATION
Vincent J. Burnelli, Silver Spring, Md.; Hazel G. Burnelli, executrix of said Vincent J. Burnelli, deceased
Filed Mar. 23, 1964, Ser. No. 353,720
2 Claims. (Cl. 244—36)

This invention relates broadly to turbo-jet fan type engine installation applied to the Burnelli lifting body principle of airplane design, and in its more specific aspects it relates to such installations which provide advantages effecting improved propulsive efficiency, aerodynamic lift reaction with greater inherent design safety and balance load conditions; and the nature and objects of the invention will be readily recognized and understood by those skilled in the art to which it relates in the light of the following explanation and detailed description of the accompanying drawings illustrating what I at present believe to be the preferred embodiment or mechanical expressions of my invention from among various other forms, arrangements, combinations and constructions, of which the invention is capable within the spirit and scope thereof.

One of the major purposes of my invention is to augment the lift of the airplane and I accomplish this by the installation of the turbo-jet fan type engines forward of the leading edge of the airfoil body element with the jet outlets of high velocity directed over the upper surface thereof.

As a result of my unique arrangement of the turbo-jet fan type engines with relation to the airfoil body, employing enlarged ducted fans for propulsion and lift suction effect a substantially greater volume of high velocity air is provided as compared to normal jet fan installations.

One of the desirable characteristics of my invention resides in the short take off and landing qualities thereof which are especially advantageous for military use.

In combination with the high velocity jet and fan outlets, I include simplified means to provide for reverse flow braking action, with outlets above and below the engine nacelles.

The propulsive efficiency of an airplane embodying the design and arrangement of this invention is increased by the reduction of the outlet jet velocity combined with substantial increase in the combined hot gas and air volume, augmented by the increased air flow through the inlet areas within the jet engine housings.

My invention augments lift which is an important reaction, and results from the high velocity flow with boundary layer effect over the large upper surface of the airfoil body section.

This invention provides greater inherent design safety regarding crash impact, with fire hazard reduction due to the location of the jet engine mass weight and their strong body mounting structure forward of the passenger cabin section. With the engines mounted on structure, separate from the fuel containing wings, and with exhaust outlets not in line with the same, fire hazard is substantially reduced.

My invention also substantially improves balance load and control conditions due to the forward location of the jet engine weight, and this arrangement eliminates the far forward extension of the passenger section and the pilot's flight deck with relation to the center-of-lift of the wings. This is especially more favorable for best stability and control qualities, compared to most recent design trend with the jet engines installed rearward in the region of the tail group, with body extension forward for balance.

An airplane embodying the arrangement and characteristics of this invention reduces the ground jet noise problem, because the jet outlets above the large body surface will reflect the sound wave noise upward, in contrast to that of underslung wing and/or rearward fuselage mounted engines. The severe problem inherent in many jet aircraft today of jet inlet ingestion from wheel runway debris and/or wheel slush is greatly reduced by my combination and arrangement, and my invention also positions the engines where they are visable in flight and can be monitored by the flight crew.

I provide reverse flow means of simple design for breaking action and for duct outlet variation by means of a gate-valve arrangement formed by pivoting the upper surface of the housings for the jet engines. When closed a spoiler effect is obtained.

With the foregoing general objects, features and results in view, as well as certain others which will be apparent from the following explanation, the invention consists in certain novel features in design, construction, mounting and combination of elements, as will be more fully and particularly referred to and specified hereinafter.

Figure 2:
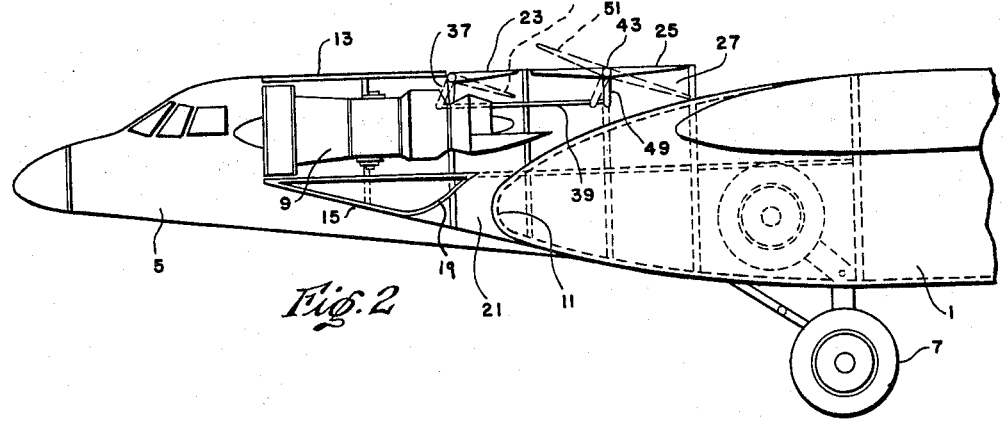
Figure 3:
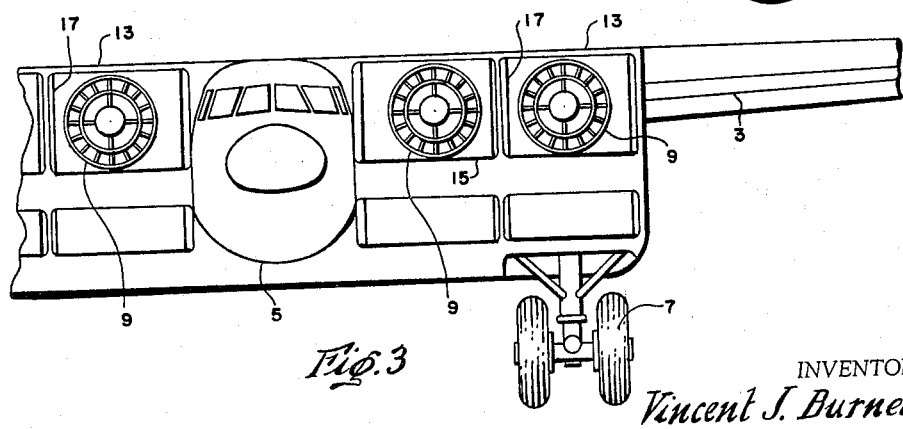

Referring to the accompanying drawings:
FIG. 1 is a top plan view of the airplane embodying my inventions, with parts thereof broken away.
FIG. 2 is a view in side elevation of the forward portion of the airplane.
FIG. 3 is a front elevational view of the airplane with parts thereof broken away.
FIG. 4 is a top plan view of the airplane with parts thereof broken away.
FIG. 5 is a view in side elevation of the airplane with parts thereof in section.
FIG. 6 is a view in front elevation of the airplane.

In the accompanying drawings I have used the numeral 1 to designate the body of an airplane of the Burnelli lifting body type, such as that generally disclosed in Patent No. 1,758,498, issued May 13, 1930 for Lifting Fuselage Airplane, and Patent No. 2,372,250, issued March 25, 1945, for Jet Propulsion. The body of the airplane which is disclosed at 1 is of airfoil body section constituting the well known Burnelli lifting body type.

Extending laterally from each side of the body section 1 of the airplane is a wing 3, one of such wings being shown in FIG. 4, but it will, of course, be understood that a wing extends from each side of the body section. Such wings normally carry the fuel load for powering the motors of the airplane and are a fire hazard in aircraft operation. The airplane of the Burnelli type also includes the pilot's or operational deck or fuselage 5 which extends forwardly from the central part of the body section 1. Any suitable type of landing gear 7 may be provided for the airplane.

In the example disclosed in the drawings I power the airplane with four jet motors 9, which are fan jets, and which are mounted on and supported from the body section 1 in such manner that they extend forwardly from the forward or leading edge 11 of such body section and they are positioned laterally adjacent to the operation deck 5. Any suitable mounting means for the jet motors may be used, the only essential being that such motors are mounted forwardly of the fuel carrying wings 3 of the airplane. It will also be appreciated that the drawing disclosure represents only an example of my invention, so that more or fewer jet motors may be used and the arrangement will still fall within the spirit and scope of my invention.

Each jet motor 9 is enclosed within a housing involving a top wall 13 and a bottom wall 15, and due to the positioning of the motors relative to the body section 1 and the front wall 11 thereof, such front or leading wall 11 forms a curved rear wall for each motor housing. Vertical side walls 17 complete the housing arrangement and also function to separate the four housings.

Each bottom wall 15 of each housing is upwardly curved as at 19 at a point thereon forwardly spaced from the forward edge 11 of body section 1, to provide an upwardly extending air duct 21 which extends upwardly toward the rear end of the motor 9, the rear end of each motor being forwardly spaced with respect to the forward edge 11 of the body section 1 of the airplane. Thus, since the front end of each motor housing is open, air will enter air inlet duct 21 and flow upwardly and rearwardly therein for expulsion over the body section 1, or expulsion forwardly in a manner and by means to be hereinafter explained.

At the rear end of the top wall 13 of each motor housing I provide an auxiliary vane 23, which in normal position lies flush with the surface of top housing wall 13, but which may be lowered into operating position in a manner to be explained. A further or major pivoting vane 25 is provided and is positioned rearwardly of the vane 23, and is flush therewith in normal position. The rear end of the vane is spaced from the body section 1 to provide the normal outlet end 27 of the duct 21.

Now it will be recognized that there is a housing for each motor, a duct 21 and outlet 27 for each motor, and the vanes 23 and 25 are provided for each of the ducts in each of the housings for each motor.

The vanes 23 and 25 are mounted in the following manner for simultaneous operation by the pilot of the aircraft. I provide a transversely extending operating rod 29 which is journaled as at 31 in the wall of the pilots compartment and extends laterally therefrom across and above the motors 9 and it journaled as at 33 in a frame member 35 of the mounting framework for the jet motors. It will be understood that the same construction and vane operating and controlling means is provided for the motors on each side of the airplane. Each vane 23 is fixed to said operating rod 29, to which is also fixed a crank 37 which extends downwardly therefrom and is fixed to a control tube 39 which extends to the pilot's compartment for operation therefrom. Consideration of the drawings will clearly indicate that when the control tube 39 is pulled forwardly the crank will also be pulled forwardly at its lower end to partially rotate rod 29 to thereby cause each vane 23 to swing downwardly as shown in dotted lines at 41 in FIG. 2, this being the fact because the crank is fixed to the forward end of each vane 23.

I provide a further operating rod 43 which extends between the pilot's compartment 5, where it is journaled at 45, and the frame member 35, where it is journaled at 47, such rod 43 extending as explained at substantially the mid-longitudinal point of the vanes 25, and each vane being fixed to such rod. Fixed to and depending from the rod is a crank arm 49 which is fixed to the control tube 39. Thus, upon operation of control tube 39 the vanes 25 will be pivoted from the normal position into the dotted line position 51 of FIG. 2.

It will be recognized that ground noises will be substantially reduced in an airplane embodying the features of this invention, since the exhaust flows over the upper surface of the body 1 and will be upwardly deflected thereby.

I claim:

1. An airplane including, in combination, a body of airfoil contour, multiple jet fan engines supported from said body in position above the forward center line thereof, and in position forwardly spaced with respect thereto, each of said jet fan engines being mounted and enclosed in a housing and each housing having an open forward end and an open rear end, and said housing provided with an air inlet between the bottom rearward edge of said housing and the forward edge of said body, said open rear end of said housing forming an outlet for expulsion of air from said inlet combined with the hot gases from said engines to increase the volume of expanding exhaust gas with reduced velocity of the outlet thrust generating gas, and said outlet being disposed to direct said combined air and hot gas over the upper body surface of said body of airfoil contour for life reaction.

2. An airplane in accordance with claim 1, wherein said inlet is open at all times and is positioned in the lower wall of each housing, and said outlet includes the curved forward edge of said body.

References Cited by the Examiner

UNITED STATES PATENTS

| 2,988,301 | 6/1961 | Fletcher | 244—36 |
| 2,989,269 | 6/1961 | Le Bel | 244—36 |
| 3,018,983 | 1/1962 | Davidson | 244—42 |
| 3,129,905 | 4/1964 | Taylor | 244—12 |

FOREIGN PATENTS

| 607,075 | 7/1960 | Italy. |
| 903,642 | 1/1945 | France. |

MILTON BUCHLER, *Primary Examiner.*

B. BELKIN, *Assistant Examiner.*